Figure 1:
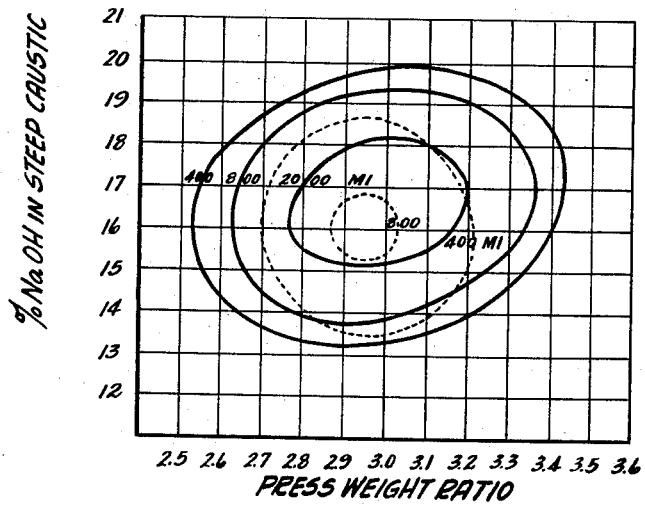

INVENTOR.
DONALD F. DURSO

United States Patent Office 2,931,734
Patented Apr. 5, 1960

2,931,734
PRODUCTION OF CELLULOSE PRODUCTS

Donald F. Durso, Memphis, Tenn., assignor to The Buckeye Cellulose Corporation, Cincinnati, Ohio, a corporation of Ohio Application July 18, 1958, Serial No. 749,552

12 Claims. (Cl. 106—123)

This invention relates to new and useful improvements in the manufacture of refined chemical wood pulp which is to be converted into viscose rayon, cellophane, cellulose acetate and similar products. More particularly, this invention relates to the discovery of certain surface active agents which under diverse processing conditions greatly facilitate the processing of refined chemical wood pulp into viscose suitable for the manufacture of regenerated cellulose products, e.g., filaments such as used in textile yarns and tire cord and films such as cellophane, cellulose acetate and the like.

This application is a continuation-in-part of the application of Donald F. Durso, Serial No. 648,064, filed March 25, 1957, now abandoned.

Broadly speaking, in viscose preparation pulp is steeped in a solution of strong caustic soda at ambient or higher temperatures, squeezed to remove excess caustic and then reduced to crumbs by shredding. After a suitable period of aging to reduce molecular weight, $CS_2$ is added and the xanthated cellulose is dispersed in weak caustic soda solution to produce the viscose "solution." Prior to extrusion into film or yarn, the material is "ripened" and filtered. During filtration, foreign particles and undispersed gels are removed by the use of several successive filter media. Undissolved matter, while important to the yield, does not ordinarily affect filterability seriously. Rather, it is the imperfectly dispersed cellulose, the gels, which plug the pores of the filter. A poor filtering viscose leads to many costly interruptions of the process by requiring frequent stopping and replacing of filter medium. Therefore, the consumer requires a filterability level which permits a high production schedule with low costs in labor and filter material.

In the early days of pulp-making, pulps were characterized by a high content of extractives which were composed of lignin, lignin derivatives and other impurities such as the natural resins present in the original wood. These pulps led to poor performance in terms of filtration and spinning caused by the presence of gummy deposits. Improvement of pulping conditions and addition of purification stages led to the production of pulp characterized by a moderate content of extractives. A significant improvement in filterability was obtained at this time. As purification processes were further improved to produce high-alpha cellulose pulps for better yarn properties, a return to poor filtering qualities was obtained. It became apparent at this point that although some of the impurities might be undesirable, others had a beneficial effect on processing.

Studies by pulp and viscose manufacturers revealed that addition of various materials to the pulp before steeping or during shredding would restore filterability. In general, all of the effective materials were surface active agents. These compounds contain a hydrophobic and hydrophilic portion which so affect solubility in any medium that the molecules tend to concentrate at the surface between two phases whether they be air and liquid, or oil and water. By variation of the groups different effects such as emulsification, re-wetting, defoaming and others can be obtained with these compounds.

Contrary to many of the statements which appear in the literature, increased filterability of a viscose solution does not automatically follow from the addition of a surface active agent to pulp, irrespective of the amount of surface active agent which is added or the particular stage of viscose manufacture at which the surface active agent is added. A number of factors in addition to those disclosed in the literature affect filterability of viscose solutions. Among these factors are the particular pulping process which was employed and variations in the type of processing steps employed by the viscose manufacturer. For example, wood pulp prepared by the "sulfate" process results in a viscose solution generally having extremely poor filtration qualities, whereas wood pulps prepared by a "sulfite" process often do not require the addition of surface active agents and in fact are quite generally not benefited to a great extent by the adidtion of such surface active agents. Furthermore, unless a "prehydrolysis" operation (as hereinafter explained) is included in the manufacture of "sulfate" pulp, surface active agents have not been observed to increase materially the filterability of viscose solutions made from such pulp.

The steeping operation is a further variable affecting the degree of increase in filterability which may be effected through the addition of surface active agents in the viscose process. The two methods of steeping presently employed by the art are characterized as "conventional sheet steeping" and "slurry steeping," and surface active agents have been observed to improve viscose filtration in varying degree depending upon which of these methods of steeping is employed in the viscose process.

It is an object of this invention to provide a class of surface active agents which will materially increase the filterability of viscose solutions manufactured from prehydrolyzed sulfate wood pulp when either a conventional or a slurry steeping operation is practiced. In one of its aspects this invention comprises the addition of these surface active agents to prehydrolyzed sulfate wood pulp at a point prior to completion of the steeping operation in the slurry process and prior to completion of shredding in the conventional sheet steeping process of viscose manufacture.

It is a further object to provide a prehydrolyzed sulfate chemical wood pulp to which the surface active agents of this invention have been added and which has outstanding utility in the manufacture of regenerated cellulose products.

Further objects and advantageous features will appear from the following detailed description.

As has hereinbefore been indicated, this invention comprises in part the use of prehydrolyzed sulfate wood pulp. In the prehydrolysis operation wood chips, or other lignin-containing cellulosic materials are conventionally treated with water, steam or dilute acid solution (up to about 0.3% solution of acid), at from about 300° to about 375° F., and at pressures greater than atmospheric, for reaction times up to about 120 minutes. This treatment is carried out under acid conditions which are preferably induced by the addition of an acid such as, for example, acetic, citric, nitric, oxalic, phosphoric, sulfurous (sulfur dioxide), sulfuric or combinations of these. Alternatively, if it is desired that no acid shall be used, and provided no alkaline agents have been added, an acid condition will develop as a result of the hydrolysis of the cellulosic raw material being heated. At the end of this treatment, the hydrolysis liquid is drained off, and the remaining solid material may be washed in situ, or the cooking liquor for the next step may be added directly without washing.

The hydrolyzed lignin-containing material is then pulped by the "sulfate" process wherein the active digesting ingredients are sodium hydroxide and sodium sulfide. This process is well-kwown to those skilled in the art and any reference to the "sulfate" method of digestion appearing herein or in the appended claims refers to digestion wherein the active digesting ingredients are sodium hydroxide and sodium sulfide.

As is well known in the art, in the production of viscose by the conventional sheet steeping method, dried cellulose sheets are placed in a steeping press and soaked in a strong solution of caustic soda. The caustic soda solution is normally introduced from the bottom of the enclosure at such a rate that it rises along the sheets in the direction of the predominant lengthwise orientation of the pulp fibers at a rate equal to that induced by the capillarity of the pulp. The operation is generally conducted at room temperature. After about one hour immersion, the pulp is pressed to obtain the desired alkali cellulose composition and then reduced to crumbs in a shredder. This latter mechanical action proceeds from about one to about two hours.

The continuous or slurry process of steeping differs from the conventional process in that the pulp is fed into a tank of concentrated caustic soda solution at a uniform rate. There it is reduced to a slurry of fibers by mechanical and hydraulic means. This step usually is conducted at temperatures above ambient temperatures, up to 65° C., with the higher temperatures being preferred because of the accelerated rate of alkali cellulose production obtainable at the higher temperatures. After an average treatment of about 15 minutes, the slurry of fibers is forced by pressure between rotating rolls which are slotted or otherwise perforated to permit drainage of the caustic. The pressed cake of alkali cellulose is then reduced to crumbs generally on one of the two types of machinery conventionally employed by the art, i.e. a "one-pass" Garnett roll type shredder or a disk refiner type shredder. Continuous shredding permits substantially instantaneous shredding of alkali cellulose by one passage of the alkali cellulose through a stator-rotor arrangement of the shredder which may be either of disk or roll design. The "Sprout-Waldron" refiner is an example of the disk type shredder as compared to the Garnett roll type shredder. The disk refiner normally subjects alkali cellulose to much less severe mechanical action than is the case with a high speed roll type shredder.

Beginning with the alkali cellulose crumbs, the two processes are substantially the same through the regeneration step. The alkali cellulose crumbs are aged under conventional carefully controlled conditions. Here, by means of alkaline oxidation, the average molecular chain length of the cellulose is reduced so that the material will have a lower solution viscosity. After aging, the alkali cellulose crumbs are mechanically mixed with the proper proportion of $CS_2$, which combines chemically to form cellulose xanthate. Upon addition of dilute caustic soda solution in a mixing device, the orange colored cellulose xanthate crumbs dissolve and form a syrupy solution which is known as "viscose." The viscose is then ripened at conventional controlled temperatures. In this ripening step, complex chemical and colloidal changes occur so that the cellulose xanthate is more easily regenerated to cellulose in spinning. Regeneration into filaments or films consists of extruding a viscose solution through the minute holes or slits of a spinneret into a bath containing acid and salts. The dissolved cellulose compound in the viscose solution reacts with the acid solutions to coagulate and regenerate cellulose which precipitates and forms continuous solid filaments or films. The salts in the bath help to control the precipitation of the cellulose and to modify the properties of the product. The combined filaments from a single spinneret make up the yarn which is washed, treated chemically to remove residual sulphur, washed again and dried. The filaments are twisted to give the yarn strength and unity. In film manufacture, the steps of washing, sulphur removal, washing and drying are also practiced.

The surface active agents, the use of which form a part of the present invention, are prepared from a refined tall oil containing from about 25 percent to about 35 percent resin acids, the preferred resin acid content being about 30 percent, and the remainder of the product consisting essentially of fatty acids such as oleic, linoleic and linolenic acids. This product is made by the fractional distillation of crude tall oil. The refined tall oil is reacted either with a mixture of 1,2-propylene oxide and ethylene oxide in varying proportions, or with 1,2-propylene oxide and ethylene oxide sequentially, the ethylene oxide being terminal. In the former instance the arrangement of the ethylene oxide and 1,2-propylene oxide units in the surface active agent is completely random. In the latter instance the ethylene oxide units and 1,2-propylene oxide units are arranged in two unitary blocks, and the structure is generally referred to as a block polymer. The reaction is carried out in a jacketed vessel in the presence of caustic alkali as a catalyst.

The following products are illustrative of the refined tall oil-propylene oxide-ethylene oxide random condensation products which have been found to possess extraordinary utility in the manufacture of regenerated cellulose products; a product of the reaction of 7 mols of ethylene oxide and 5 mols of 1,2-propylene oxide per mol of refined tall oil; a product of the reaction of 8.7 mols of ethylene oxide and 6.7 mols of 1,2-propylene oxide per mol of refined tall oil; a product of the reaction of 10.2 mols of ethylene oxide and 7.7 mols of 1,2-propylene oxide per mol of refined tall oil; and a product of the reaction of 13.7 mols of ethylene oxide and 10.2 mols of 1,2-propylene oxide per mol of tall oil. Procedures for preparing these condensation products are set forth in detail in Example IV below.

The desired benefits will be conferred by these condensation products prepared from about 2 to 100 mols of propylene oxide and ethylene oxide per mol of refined tall oil the weight ratio of propylene oxide to ethylene oxide being from about 1:3 to about 3:1. It is preferred that approximately equal amounts by weight of propylene oxide and ethylene oxide be employed in the preparation of these surface active agents. On a molar basis it is preferred that the condensation products be formed by the reaction of from about 5 to 10 mols of propylene oxide and from about 7 to 14 mols of ethylene oxide per mol of refined tall oil.

The following products are illustrative of useful refined tall oil-propylene oxide-ethylene oxide sequential condensation products, the weight ratio of ethylene oxide to propylene oxide being 1:1 in all instances: a product of the reaction of two mols total of polyalkylene oxide (i.e., polypropylene oxide plus polyethylene oxide) per mol of refined tall oil; a product of the reaction of 4 mols total of polyalkylene oxide per mol of refined tall oil and a product of the reaction of 10 mols total of polyalkylene oxide per mol of refined tall oil. There can be employed in the practice of the invention condensation products formed by the reaction of from 2 to 100 mols of propylene oxide and ethylene oxide per mol of refined tall oil, the weight ratio of propylene oxide to ethylene oxide being from about 1:3 to about 3:1. It is preferred that the molar ratio of total polyalkylene oxide to refined tall oil be from 2:1 to 10:1 and that the weight ratio of propylene oxide to ethylene oxide be about 1:1.

Condensation products made by reacting refined tall oil containing 25% to 35% resin acids with a mixture of propylene oxide and ethylene oxide or with 1,2-propylene oxide and ethylene oxide sequentially to form the products which find use in this invention are believed to be novel, and their use in this invention is believed to represent the first use of such compounds.

Viscose solutions made from prehydrolyzed sulfate wood pulps containing from about 0.02% to about 0.3% by weight, based on the pulp, of these surface active agents display greatly improved filterability when either the conventional or the slurry methods of steeping comprise a part of the processing. Optimum filtration and improvement in viscose yarn properties can be realized when the prehydrolyzed sulfate pulp contains from about 0.1% to about 0.2% by weight of the surface active agents of this invention.

As previously discussed, the surface active materials which find use in the practice of this invention surprisingly and unexpectedly increase the filterability of viscose solutions when slurry as well as conventional methods of steeping are employed in the processing of prehydrolyzed sulfate wood pulp preliminary to the preparation of such viscose solutions. In the following examples there are illustrated preferred embodiments of this invention as well as slurry and conventional steeping processes, but the examples are not to be construed as limiting the scope of this invention.

EXAMPLE I

In detail, the slurry process is as follows:

The pulp sample is prepared by cutting 150 grams of sheeted cellulose into 2" square pieces. The pulp is added piece by piece in about three minutes to three liters of 18.5 percent sodium hydroxide solution at 65° C., while stirring with a mixer.

After slurrying 15 minutes the pulp is poured into a metal cylinder having a stainless steel screen bottom and a drain plug. A solid iron ram is placed in the cylinder so that a cake, 6" in diameter and 1¼ to 1½" thick, is obtained, which has a weight ratio of 2.7 times the original weight of the pulp.

The cake is broken into pieces and passed one time through a motor-driven stainless steel picker. Two portions of 175 grams of the fluffed alkali cellulose are weighed out and placed in two half-gallon jars for aging 21 hours at 23° C.

After aging, the alkali cellulose is transferred to a stainless steel churn. Carbon disulfide is added in an amount sufficient to provide 34% $CS_2$ based on the weight of cellulose in the alkali cellulose. The churn is sealed and placed on a machine to roll and tumble the contents for one hour at 35° C.

The cellulose xanthate is transferred to a stainless steel 2 liter beaker to be diluted and stirred to form an aqueous alkali viscose colloidal solution. The beaker, approximately half full of a mixture of 8.1% cellulose in 6% sodium hydroxide, is stirred by mechanical means for two hours and fifteen minutes.

The filtration is measured by pouring about a liter of viscose solution into a steel cylinder or barrel, sealing and applying air pressure to force the viscose through a conventional type filter of standard size and construction. The filtrate is measured either gravimetrically or volumetrically, and the time for completion of filtration is recorded.

In the conventional steeping process, sheets of refined chemical pulp having dimensions of 10 inches by 10 inches are employed. Approximately 450 grams of such sheets are placed in a steeping press with the predominant lengthwise orientation of the pulp fibers in the sheets being perpendicular to the bottom of the press. 18.5 percent caustic soda solution is introduced into the steeping press until the press is filled to a level ½ inch above the top of the sheets of pulp. After one hour, the steeped and drained pulp is hydraulically pressed to a weight equal to 2.9 times the air dry weight of the pulp sheets.

The pressed and weighed pulp is then shredded for one hour at a temperature of 29° C. At the completion of the shredding 240 gram portions of the shredded pulp (alkali cellulose crumbs) are placed in each of two half-gallon jars for aging 21 hours at 29° C.

After aging, $CS_2$ is added to the alkali cellulose in the jars in an amount sufficient to provide 34% $CS_2$ based on the weight of the cellulose in the alkali cellulose. The bottles are sealed and placed on a machine to roll and tumble the contents for one hour at 25° C. Excess $CS_2$ is removed under vacuum and a caustic soda solution is added in an amount sufficient to give an aqueous alkali viscose colloidal solution of 7.0% cellulose and 6.0% sodium hydroxide. The viscose solution is stirred for two hours with a mechanical mixer.

The viscose solutions in the two jars are mixed together and poured into a steel cylinder or barrel which is then sealed. Air pressure forces the viscose solution through a filter of standard size and construction. The

Rating

| Trade Name | Slurry Steep | | Conventional Steep, Grams of Filtrate | Type |
|---|---|---|---|---|
| | K Value | Grams of Filtrate | | |
| Pluronic L-64 | 163.9 | 27.6 | 1,225±255 | Polyethylene oxide (EtO)-polypropylene oxide (PrO) block polymer containing as the central moiety 26-31 PrO units with 10-20 EtO units at each end of the molecule. |
| Synthetics AR-150 | 148.5 | 22.6 | 7,795±1,560 | EtO resin acid ester (15 mols of EtO per mol of resin acid). |
| Synthetics AR-50 | 256.1 | 16.1 | 3,075±615 | EtO resin acid ester (5 mols of EtO per mol of resin). |
| Synthetics AD-160 | 242.0 | 13.4 | 8,445±1,690 | Resin (abietyl) alcohol-EtO ether (16 mols of EtO per mol of alcohol). |
| L-712 | 361.3 | 7.1 | 6,155±1,230 | EtO ester produced from refined tall oil, containing 30% resin acids, and 16 mols of EtO per mol of tall oil. |
| Acintol R | 198.9 | 13.3 | 3,350±670 | Tall oil resin. |
| L-730-2 | 68.1 | 49 | 3,765±755 | The condensation product obtained by reacting with a refined tall oil containing 32% resin acids a mixture of 6.7 mols of ethylene oxide and 8.7 mols 1,2-propylene oxide per mol of the refined tall oil. This is the product of the present invention. |
| Control | 170.2 | 9.4 | 640±95 | | filtrate is weighed, and the time for completion of filtration is recorded.

The effect of steeping method on the filterability of viscose solutions prepared from prehydrolyzed sulfate pulp to which various surface active agents had been added uniformly to all surfaces of the air dry pulp sheet in an amount equal to 0.1% by weight of the bone dry pulp, was determined using each of the two methods outlined above and the results of each determination are set forth in the table above.

The K value shown on the table is well known to the art as the "plugging constant" of a viscose solution. It is calculated from the time and filtrate weight data obtained by forcing a viscose solution through conventional standard filter under standard conditions and is directly proportional to the rate at which the viscose solution plugs the filter. In the slurry steep procedure, for significance over the control pulp, K values must be less than 73.4 and grams filtered greater than 25.9 in the above rating table.

It is quickly apparent from the above table that all of the surface active agents set forth therein significantly increased filtration when the refined chemical pulp was steeped by the conventional method. However, when slurry steeping was employed, increased filtration was effected only by the L-730-2 which is one of the surface active agents of this invention. This outstanding advantage of the refined tall oil ethylene oxide-propylene oxide reaction products of this invention is particularly surprising in view of the close chemical similarity thereto of many of the other surface active agents tested. Substantially the same improvement is noted in the use of other reaction products coming within the definition above, as will appear from the following examples.

EXAMPLE II

The filtration data contained in the following table were obtained from viscose solutions prepared from prehydrolyzed sulfate pulp to which the surface active agents had been added uniformly to all surfaces of the air dry pulp sheet in an amount equal to 0.1% by weight of the bone dry pulp. The slurry and conventional steep processing conditions were as set forth in Example I.

Rating

| Surface Active Agent | Mols of propylene oxide per mol of tall oil | Mols of ethylene oxide per mol of tall oil | Slurry Steep | | Conventional Steep, Grams of Filtrate |
|---|---|---|---|---|---|
| | | | K Value | Grams of Filtrate | |
| L-730-1 | .5 | 7 | 53 | 68 | 4,735±945 |
| L-730-2 | 6.7 | 8.7 | 47 | 87 | 3,765±755 |
| L-730-3 | 7.7 | 10.2 | 67 | 52 | 2,415±485 |
| L-730-4 | 10.2 | 13.7 | 17 | 181 | 2,240±450 |

The above surface active agents were condensation products obtained by reacting the designated molar amounts of ethylene oxide and 1,2-propylene oxide as a mixture with refined tall oil containing 32% resin acids. As in Example I, the surface active agents of this invention substantially increased filtration of viscose solutions when the refined prehydrolyzed sulfate chemical pulp was steeped by either the slurry or the conventional method.

EXAMPLE III

In addition to improving filtration as described hereinbefore, the reaction products of this invention when employed in the manufacture of viscose rayon textile yarn display a remarkable and totally unexpected capacity to impart to the yarn certain improved and highly desirable characteristics.

Viscose yarn prepared with a conventional steeping procedure from prehydrolyzed sulfate pulps to which were added 0.1% and 0.2% by weight, based on the bone dry pulp, of the L-730-2 described in Examples I and II displayed the following improvements.

| L-730-2 | Denier | Conditioned Properties | | | Wet Properties | | |
|---|---|---|---|---|---|---|---|
| | | Tenacity, grams/denier | Elongation, Percent | Silk Factor | Tenacity, grams/denier | Elongation, Percent | Silk Factor |
| None | 149.9 | 1.96 | 17.6 | 34.5 | 0.88 | 37.4 | 33.1 |
| 0.1% | 151.0 | 2.01 | 19.5 | 39.1 | 0.95 | 41.1 | 39.2 |
| 0.2% | 147.6 | 2.01 | 19.6 | 39.5 | 0.96 | 41.8 | 40.3 |

In the practice of the present invention, an increase in tenacity was noted, and it was accompanied by an increase, rather than the expected decrease in elongation. This improvement in the yarn physical properties is reflected by the silk factor which is the product of the tenacity and elongation of yarn and which is considered to be a more satisfactory index of yarn properties than either tenacity or elongation alone.

EXAMPLE IV

L-730-1 which is typical of the random type condensation products of this invention, is prepared in the following manner:

One of the reactants employed was a refined tall oil containing 32% resin acids, the remainder of the product consisting essentially of oleic, linoleic, and linolenic acids. This refined tall oil is commercially available under the trade name Acintol D and is prepared by fractional distillation of crude tall oil. The other reactants were 1,2-propylene oxide and ethylene oxide mixed in equal amounts by weight. The reaction was carried out in a jacketed vessel in the presence of caustic alkali as a catalyst.

Twenty-four pounds of the mixture containing ethylene oxide and 1,2-propylene oxide in an equal weight ratio were added to 12 pounds of refined tall oil and 30 grams of NaOH. The temperature was raised from 134° C. at a pressure of 50 pounds per square inch to 164° C. at a pressure of 70 pounds per square inch in a period of 4 hours and 40 minutes during which time the mixed oxides were gradually introduced into the tall oil mixture containing the caustic alkali catalyst.

The resultant product contained 7 ethylene oxide units and 5 1,2-propylene oxide units per mole of tall oil and when employed in the processing of a refined prehydrolyzed chemical sulfate wood pulp into viscose rayon significantly improved the filterability of the viscose solution when either the slurry or conventional method of steeping was employed in the processing of the pulp into viscose rayon.

The sequential type condensation products which find use in the practice of this invention are prepared in a like manner, except that the 1,2-propylene oxide and ethylene oxide are introduced into the reaction vessel sequentially instead of simultaneously.

EXAMPLE V

Employing the slurry steep process conditions set forth in Example I, the following data were obtained in the use of the indicated surface active agents which were obtained by reacting refined tall oil containing 32% resin acids with propylene oxide and ethylene oxide sequentially, the weight ratio of propylene oxide to ethylene oxide being 1:1 and the ethylene oxide being terminal.

| Trade Name | Ratio of Total Polyalkylene Oxide to Tall Oil | Grams of Filtrate | K Value |
|---|---|---|---|
| L-1098 | 2:1 | 164 | 24 |
| L-1101 | 4:1 | 124 | 23 |
| L-1102 | 10:1 | 292 | 27 |

In addition to the designated substantial filtration improvement, the use of the above three surface active agents results in a decided improvement in silk factor when employed in the manufacture of viscose rayon textile yarn. Also, these surface active agents effectively improve filtration when employed in the conventional steeping method described in Example I, and are therefore as versatile in their uses as are the surface active agents described in the previous examples.

Figure 1 indicates the steeping caustic concentration-press weight ratio relationships within which certain minimum filtration levels are obtained with and without the use of the surface active agents of the invention, the term "press weight ratio" indicating the ratio of weight of the final mass of alkali cellulose to the weight of the original unreacted air-dry cellulose forming that mass. The areas within the dotted lines pertain to the designated minimum filtration level, e.g., 800 ml., obtainable without added surface active agent, while the areas within the solid lines pertain to the designated minimum filtration level obtained with the same pulp, containing however, 0.1% of the surface active agent in accordance with this invention. It is readily apparent that for a given minimum filtration level the operable ranges of caustic concentration and press weight ratio are very much broader for the pulp which had been treated with surface active agent.

In the experimental work, the results of which are set forth in Figure 1, the surface active agent employed was an ethylene oxide-propylene oxide random condensation product of the reaction of refined tall oil containing 32% resin acids with 6.7 mols of propylene oxide and 8.7 mols of ethylene oxide per mol of tall oil, the surface active agent being present on the pulp in an amount equal to 0.1% by weight of the pulp. The surface active agent was applied as a two gram/liter aqueous solution uniformly to all surfaces of the air dry pulp sheet. The test procedure employed was similar to the procedure set forth in Example I, except that the steeping temperature was 40° C., and variations were made in the caustic steeping concentration and the press weight ratio.

Figure 2:
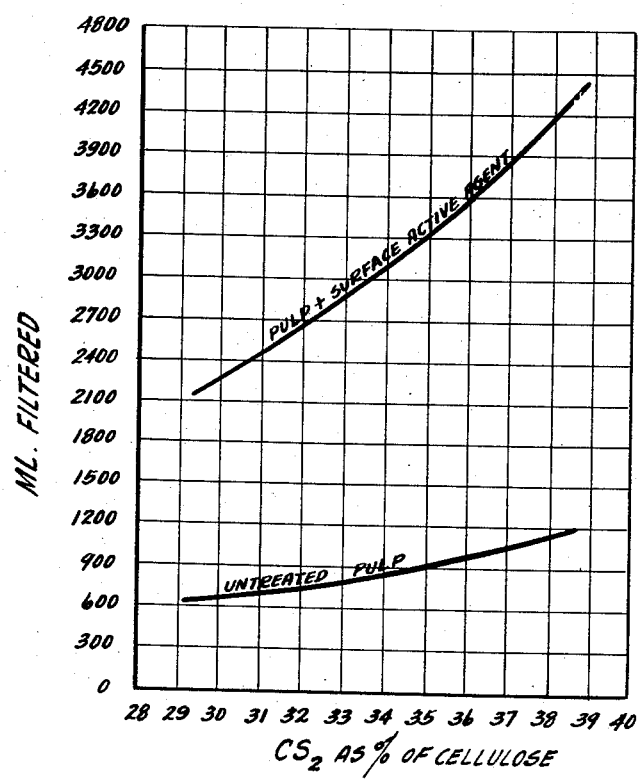

In Figure 2 there is represented graphically the increases in viscose filtration which can be obtained at various $CS_2$ levels when the surface active agents of this invention are added to the prehydrolyzed sulfate pulp. There was employed in this experimental work 0.1% by weight of the reaction product of a mixture of ethylene oxide and propylene oxide with a refined tall oil containing 32% resin acids, the average number of mols of propylene oxide being 6.7 and the average number of mols of ethylene oxide being 8.7 per mol of tall oil. The test procedure employed, once again, was similar to the procedure set forth in Example I, except that steeping temperature was 40° C., steep caustic was 16.6 percent NaOH solution by weight, press weight ratio was 2.99 and $CS_2$ level was varied from 29 to 39 percent by weight of the cellulose in the alkali cellulose. It is apparent from analysis of Figure 2 that the rate of filtration increase with increase in $CS_2$ percentage is much greater in the case of the pulp to which surface active agent had been added; furthermore, filtration increased in proportion to $CS_2$ level throughout the entire range tested. Both the untreated and the treated pulps were employed at the optimum steeping and pressing conditions as set forth above.

The surface active agents of this invention may be added to the cellulose at any convenient stage of processing. For example, they may be added to the pulp during the formation of the pulp sheet, after formation of the sheet but prior to completion of drying the sheet or after the sheet has been formed and dried. The surface active agents may also be added to the alkali cellulose prior to the completion of shredding. The agents, alone or in admixture may be sprayed onto the entire surface area of the sheet or be applied to the sheet as narrow stripes, although when the steeping process is followed by one-pass shredding application by striping is not the preferred practice because of the relatively short duration of shredding and the consequent lessened opportunity for distribution of the surface active agent.

There is claimed:

1. A prehydrolyzed sulfate chemical wood pulp capable of being converted into viscose displaying a high degree of filterability by both the conventional sheet steeping and the slurry techniques for viscose production, said pulp having incorporated therein from about 0.02% to 0.3%, based on the bone dry weight of said pulp, of a surface active agent comprising the condensation product of refined tall oil containing about 25% to about 35% resin acids with a member selected from the group consisting of (1) a mixture of propylene oxide and ethylene oxide and (2) propylene oxide and ethylene oxide introduced sequentially with the ethylene oxide being terminal, the molar ratio of total polyalkylene oxide to refined tall oil being from 2:1 to 100:1 and the weight ratio of propylene oxide to ethylene oxide being from about 1:3 to about 3:1.

2. The product of claim 1 wherein the refined tall oil contains 30% resin acids and the weight ratio of propylene oxide to ethylene oxide is about 1:1.

3. A prehydrolyzed sulfate chemical wood pulp capable of being converted into viscose displaying a high degree of filterability by both the conventional sheet steeping and the slurry techniques for viscose production, said pulp having incorporated therein from 0.1% to 0.2%, based on the bone dry weight of said pulp, of a surface active agent comprising the condensation product of refined tall oil containing about 30% resin acids with a mixture of from 5 to 10 mols of propylene oxide and from 7 to 14 mols of ethylene oxide per mol of refined tall oil.

4. The product of claim 3 wherein the propylene oxide and ethylene oxide are substantially equal in amount by weight.

5. A prehydrolyzed sulfate chemical wood pulp capable of being converted into viscose displaying a high degree of filterability by both the conventional sheet steeping and the slurry techniques for viscose production, said pulp having incorporated therein from 0.1% to 0.2%, based on the bone dry weight of said pulp, of a surface active agent comprising the reaction product of refined tall oil containing about 30% resin acids with propylene oxide and ethylene oxide introduced sequentially with the ethylene oxide being terminal, the molar ratio of total polyalkylene oxide to refined tall oil being from 2:1 to 10:1 and the weight ratio of propylene oxide to ethylene oxide being from about 1:3 to about 3:1.

6. The product of claim 5 wherein the propylene oxide and ethylene oxide are substantially equal in amount by weight.

7. In the manufacture of regenerated cellulose products from sheeted prehydrolyzed sulfate chemical wood pulp by the viscose process, the step of incorporating, at a stage prior to completion of shredding, from about 0.02% to about 0.3% based on the bone dry weight of said pulp, of a surface active agent comprising the condensation product of refined tall oil containing about 25% to 35% resin acids with a member selected from the group consisting of (1) a mixture of propylene oxide and ethylene oxide and (2) propylene oxide and ethylene oxide introduced sequentially with the ethylene oxide being terminal, the molar ratio of total polyalkylene oxide to refined tall oil being from 2:1 to 100:1 and the weight ratio of propylene oxide to ethylene oxide being from about 1:3 to about 3:1, whereby viscose displaying a high degree of filterability is produced by both the conventional sheet steeping and the slurry techniques for viscose production.

8. In the manufacture of regenerated cellulose products from sheeted prehydrolyzed sulfate chemical wood pulp by the viscose process, the step of incorporating, at a stage prior to completion of shredding, from 0.1% to about 0.2%, based on the bone dry weight of said pulp, of a surface active agent comprising the condensation product of refined tall oil containing about 30% resin acids with a member selected from the group consisting of (1) a mixture of propylene oxide and ethylene oxide and (2) propylene oxide and ethylene oxide introduced sequentially with the ethylene oxide being terminal, the molar ratio of total polyalkylene oxide to refined tall oil being from 2:1 to 100:1 and the weight ratio of propylene oxide to ethylene oxide being 1:1, whereby viscose displaying a high degree of filterability is produced by both the conventional sheet steeping and the slurry techniques for viscose production.

9. In the manufacture of regenerated cellulose products from sheeted prehydrolyzed sulfate chemical wood pulp by the viscose process, the step of incorporating, at a stage prior to completion of shredding, from 0.1% to 0.2%, based on the bone dry weight of said pulp, of a surface active agent comprising the condensation product of refined tall oil containing about 30% resin acids with a mixture of from 5 to 10 mols of propylene oxide and from 7 to 14 mols of ethylene oxide per mol of refined tall oil, whereby viscose displaying a high degree of filterability is produced by both the conventional sheet steeping and the slurry techniques for viscose production.

10. The process of claim 9 wherein the propylene oxide and ethylene oxide are present in substantially equal amounts by weight.

11. In the manufacture of regenerated cellulose products from sheeted prehydrolyzed sulfate chemical wood pulp by the viscose process, the step of incorporating, at a stage prior to completion of shredding, from 0.1% to 0.2%, based on the bone dry weight of the said pulp, of a surface active agent comprising the reaction product of refined tall oil containing about 30% resin acids with propylene oxide and ethylene oxide introduced sequentially with the ethylene oxide being terminal, the molar ratio of total polyalkylene oxide of refined tall oil being from 2:1 to 10:1 and the weight ratio of propylene oxide to ethylene oxide being from about 1:3 to about 3:1, whereby viscose displaying a high degree of filterability is produced by both the conventional sheet steeping and the slurry techniques for viscose production.

12. The process of claim 11 wherein the propylene oxide and ethylene oxide are present in substantially equal amounts by weight.

References Cited in the file of this patent
UNITED STATES PATENTS

| | | |
|---|---|---|
| Re. 24,486 | Mitchell | June 10, 1958 |
| 2,664,360 | Charles et al. | Dec. 29, 1953 |